US012786700B2

(12) United States Patent
Kandan et al.

(10) Patent No.: US 12,786,700 B2
(45) **Date of Patent: *Nov. 3, 2026**

(54) SYSTEM AND METHOD FOR SECURE COMMUNICATION WITH A NETWORK DEVICE

(71) Applicant: Stel Life, inc., Philadelphia, PA (US)

(72) Inventors: Siddharth Kandan, Philadelphia, PA (US); Jonathan Pry, Philadelphia, PA (US); Carlos Roque, Philadelphia, PA (US)

(73) Assignee: Stel Life, Inc., Philadelphia, PA (US)

(*) Notice: Subject to any disclaimer, the term of this patent is extended or adjusted under 35 U.S.C. 154(b) by 264 days.

This patent is subject to a terminal disclaimer.

(21) Appl. No.: 18/799,416

(22) Filed: Aug. 9, 2024

(65) Prior Publication Data

US 2024/0406719 A1 Dec. 5, 2024

Related U.S. Application Data

(63) Continuation of application No. 17/649,882, filed on Feb. 3, 2022, now Pat. No. 12,075,237, which is a continuation of application No. 16/198,936, filed on Nov. 23, 2018, now Pat. No. 11,246,026.

(51) Int. Cl.

| | |
|---|---|
| ***H04W 12/033*** | (2021.01) |
| ***H04W 4/80*** | (2018.01) |
| ***H04W 8/00*** | (2009.01) |
| ***H04W 12/03*** | (2021.01) |
| ***H04W 12/041*** | (2021.01) |
| ***H04W 12/0471*** | (2021.01) |
| ***H04W 12/06*** | (2021.01) |
| ***H04W 12/50*** | (2021.01) |
| ***H04W 24/02*** | (2009.01) |
| ***H04W 80/02*** | (2009.01) |
| ***H04W 88/16*** | (2009.01) |

(52) U.S. Cl.

CPC ........... *H04W 12/033* (2021.01); *H04W 4/80* (2018.02); *H04W 12/03* (2021.01); *H04W 12/0471* (2021.01); *H04W 12/068* (2021.01); *H04W 12/50* (2021.01); *H04W 8/005* (2013.01); *H04W 12/041* (2021.01); *H04W 24/02* (2013.01); *H04W 80/02* (2013.01); *H04W 88/16* (2013.01)

(58) Field of Classification Search

CPC ........... H02H 9/04; H04L 9/3278; H04L 9/50; H04L 67/133; H04W 76/14; H04W 4/80; H04W 12/40; H04W 12/041; G06F 16/258; G06F 21/62

See application file for complete search history.

(56) References Cited

U.S. PATENT DOCUMENTS

2019/0245848 A1* 8/2019 Divoux ............... H04L 63/0815

* cited by examiner

*Primary Examiner* — Iqbal Zaidi

(57) ABSTRACT

A network node stores connection data required for remote devices to connect with it and to share content data with it. The network node shares the connection data with other network nodes that are capable of communicating with the remote device and retrieves connection data for a remote device from another network node if the connection data is not stored in the first node. The network node also communicates with a remote server that is communication with a trusted vault via a private network to retrieve the connection data if it is not present in one of the other network nodes. The network node securely communicates content data received from the remote devices to a remote data store.

12 Claims, 9 Drawing Sheets

800

900

SYSTEM AND METHOD FOR SECURE COMMUNICATION WITH A NETWORK DEVICE

RELATED APPLICATIONS

This application is a continuation of U.S. patent application Ser. No. 17/649,882, filed Feb. 3, 2022, which is a continuation of U.S. patent application Ser. No. 16/198,936, filed Nov. 23, 2018 (now U.S. Pat. No. 11,246,026), each entitled "System for Secure Passive Wireless Communication with Bluetooth Vitals Devices". Each of the foregoing is incorporated by reference as though set herein in its entirety.

FIELD OF THE DISCLOSURE

This disclosure relates generally to gateways adapted to securely communicate with network devices and remote systems.

BACKGROUND

So called "Smart" vital signal medical devices have become ubiquitous and readily available, contained in such products as consumer smart-scales, smart blood pressure meters, smart glucose meters, and others. The data produced by such devices is useful in a number of healthcare and wellness environments. However, the wireless technology and protocols used in such readily available consumer equipment makes long range transmission difficult for a number of reasons. The system described herein offers a more robust apparatus and method for performing this task.

Typically, vitals devices are equipped with integrated Bluetooth Low Energy (BLE) radios. BLE itself, a relatively short-range protocol, requires some form of a gateway device to allow long range transmission of the data to remote web services or Electronic Health Record (EHR) systems. For the most common instances, a user's smartphone is expected to fulfill this role. Further details can be found in the Bluetooth Core Specification version 4.0 and later.

One drawback of using a cellular phone for this role is that many devices require the phone to be in close proximity to the device when the measurement is taken. Additionally, a specific application related to the smart device often must be installed and configured by the user of the system. This requires multiple specific application software sets to be installed on the phone of a single user if they have multiple smart devices. Additionally, the application software may need to be performed in the foreground, meaning that the telephone requires a user's interaction prior to and during the measurement process. This entails an additional burden upon the patient and consumer of such data.

Another drawback associated with using a cellular phone is that BLE connections themselves are often unreliable on complex platforms, such as modern smartphones, which have many hidden software activities being simultaneously performed. Packets over a BLE link can be reordered or coalesced many times from connection to connection, in essence, by changing the over-the-air persona of the smartphone, further exposing transmission errors and precipitating the occurrence of reception errors that may be present in the smart device's firmware.

Another common difficulty encountered with connecting a multi-protocol gateway device communicating with a BLE device to a longer range wireless network is the timing-sensitive nature of the BLE packets. Bluetooth Low Energy (BLE) divides the 2.4 Ghz industrial, scientific and medical devices (ISM) band into 40 channels of 2 Mhz in width. Although not conforming to a linear map between frequency space and channel id number, the protocol makes an effort to spread communications over the entire width of the ISM band in order to probabilistically avoid interference from other BLE connections as well as WiFi/802.11x or any other communications system making use of the band. Attempts to create a form of a dedicated communication channel tunnel where a remote service makes requests to send and receive BLE packets may again encounter limitations in the smart devices where both elements expect events to take place in narrow intervals and cannot tolerate jitter or delay in the timing.

An additional difficulty associated with producing such a gateway is that some long-range communications technologies may have unacceptably long latencies and low bit rates. Even though some smart devices may measure quantities as simple as a person's weight, the total data volume of data that needs to be transferred can result in tens of thousands of bytes. Reducing the requisite volume of data is a desired intention.

BLE smart devices utilize a security model that involves a "pairing" process whereby the remote device and the "host" device perform a key exchange that allows for secure communication. Some methods of key-exchanges require a user interface on the "host" device to enter a secure entry of a secret code, typically known as a "PIN". This is nearly impossible on a gateway device that contains no user interface. Even in cases where a user interface is neither available or not required, the process appears to be too complicated for many users, with many users reporting difficulty in pairing their devices. Additionally, it does not make sense that users themselves must perform the key exchange since it should be possible to distribute keys between the device and gateway prior to device distribution in order to achieve the same, or an even higher level, of security. The security function is expressed by: E.sub.x(y), which is the AES-128 standard encryption of plaintext y by key x as defined in FIPS-197.

Another limitation associated with BLE gateways is their relatively short reception range, which may not allow a single gateway to achieve ideal coverage for an entire building. The use of multiple gateways can incur significant cost because of the need to use multiple long range wireless transmitters. Additionally, smart home devices that are "paired" with one gateway may begin to lose their connectivity function if they are moved ever so slightly to connect to a different gateway in the same building.

Yet another common problem is that it may not be necessary to limit the instances in which data can be collected from a smart device to those instances where a specific gateway is in proximity of said device since the end point for the data is actually an internet service.

SUMMARY OF THE DISCLOSURE

A secure communication device is adapted to operate in a networked multi-protocol system that may communicate with smart devices. The communication device may include a Bluetooth communication network controller, having a processor and transmitter, said network controller configured to maintain consistent over-the-air profile from the smart devices perspective and receive information from the smart devices and transmit said information from the smart devices for use by stakeholders over a communication channel.

The device gateway uses an address in a random privately resolvable space by exchanging keys over a publicly offered communication channel wherein the same address resolution key is re-used to generate an offered MAC address to further afford the exchange of more secure bonding keys that are transparently copied between device gateways, said key computation more specifically contained in a variation of a known sequence.

The Bluetooth controller transceiver is interoperable with a plurality of smart devices, wherein said plurality of smart devices are BLE configured medical vital signs devices.

The secure communication device further includes components selected from the group consisting of a LoRa transceiver element wherein said LoRa transceiver is further operable on a separate and concurrent radio channel simultaneously with said other communication channels; a WiFi transceiver element wherein said WiFi transceiver is further operable on a separate and concurrent radio channel simultaneously with said communication channels; a cellular transceiver element wherein said cellular transceiver is further operable on a separate and concurrent radio channel simultaneously with said communication channels; an Ethernet transceiver element wherein said Ethernet transceiver is further operable on a separate and concurrent radio channel simultaneously with the communication channels; a direct IP transceiver element wherein said direct IP transceiver is further operable on a separate and concurrent radio channel simultaneously with communication channels; and combinations thereof.

The secure communication device may be a gateway and include at least two a gateways forming a mesh network configured to maximize communications with said smart devices. The number of gateways is dependent upon the number of smart devices in use and what is necessary to allow efficient communications between the smart devices which can be vitals devices and the gateways.

The secure communication device may contain software running on the device, said software being reformatted through a series of pre and post processors to output a readily understood object format; processing said object format through a shared libraries printer to further optimize said object code for execution on a stack-oriented virtual machine (VM) architecture.

The secure communication device may contain software running on the device with an executable software image being optimized in order to reduce the bandwidth required for transport over the network by creating a more lightweight version of the binary image by containing it in a more size and load time efficient format.

The secure communication device includes specific software programs which are selectively loaded depending on which smart home devices a gateway should be interconnected to by detecting devices expected to be in range. Multiple drivers are downloaded in unique combinations specific to vitals devices known to be in range of said gateways.

The secure communication device's Bluetooth controller receives identification packets from PDAs and wearables wherein the location of the PDAs and wearables in relation to the smart devices is correlated to determine the identity of the user of the smart device.

The secure communication system may communicate with smart devices and include a Bluetooth gateway having a processor and transmitter, said gateway configured to maintain consistent over-the-air profile from the smart devices' perspective and to receive information from the smart devices and transmit said information from the smart devices for use by stakeholders over a communication channel, a private network that may receive information from, and may be in communication with, said gateway. The private network may have a secure network gateway service for receipt of secure encrypted information from said smart devices received by said Bluetooth gateway and a trusted vault service for storing at least one long term key for use in pairing smart devices with said Bluetooth gateway. The trusted vault may be in communication with said secure network gateway. A webserver API may operate to receive properly authenticated and secure transmissions from outside said private network.

The gateway may generate a long term key which is stored in the trusted vault service, and the pairing of the gateway and smart devices may occur in a safe space which is free from access by middlemen and contains protection against propagation of signals outside the safe space.

A long term key obtained from the gateway may allow the newly added smart devices to communicate with the gateway without the need of going through routine pairing techniques. Information generated by said smart devices may be injected into the third party servers without any access to or transmission of private user information.

BRIEF DESCRIPTION OF THE DRAWINGS

The accompanying drawings, illustrate exemplary embodiments of the disclosure, and together with all of the parts of this application, serve to explain the features of the disclosure.

DETAILED DESCRIPTION OF THE PREFERRED EMBODIMENT

Many smart devices are now readily available in consumer markets. For example: body weight scales, blood-pressure monitors, glucometers, thermometers, pulse oximeters and fitness trackers are a subset of the myriad of medical monitoring devices available to consumers and healthcare professionals. Manufacturers consistently focus on providing a more ideal user experience involving the user's phone and either a single medical smart vitals device or a number of medical smart vitals devices. Communication standards, so far, have been a low priority, and in many cases, manufacturers have undertaken efforts specifically aimed at limiting interoperability. From a healthcare perspective, this has limited the utility of what is clearly a preferred digital generated healthcare data format, since the smart home devices already have the capability to transmit data wirelessly. The various embodiments set forth herein create a form of wireless wide area network (WWAN) that is capable of communicating with this plethora of smart devices using an extension of the BLE standard.

As an example, an individual may own various smart home devices in their home, such as a body-weight scale or a blood pressure monitor, as well as use several more portable devices, such as a glucometer and a pulse oximeter. All of these smart home devices, while having a need to navigate a diverse set of higher level protocols, would make use of the underlying BLE protocol. Although these devices are all designed to make use of a personal area network (PAN), a preferred embodiment using a wireless system set forth herein allows them to work as though BLE is a wide area network (WAN) protocol.

Figure 1:
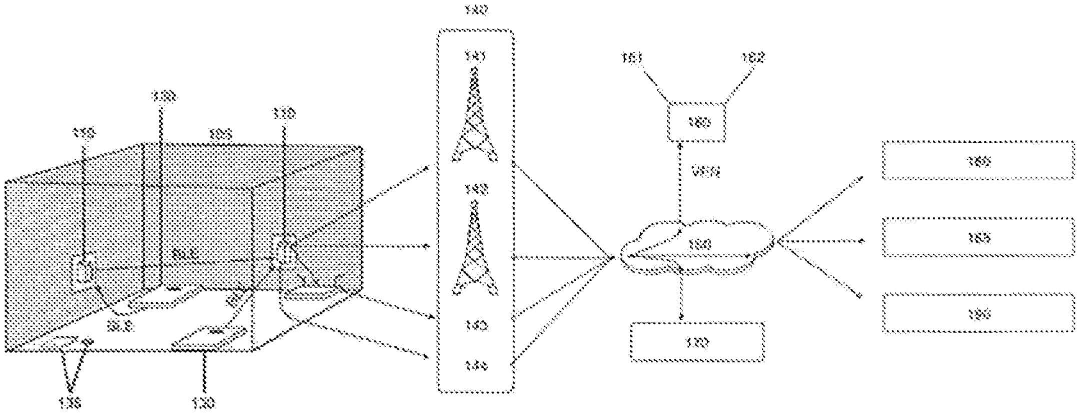
FIG. 1 illustrates the functional components of an embodiment of a wireless communication system.

By installing one or many of the device gateways 110 to communicate with a vitals device 130, the data flow system in FIG. 1 is enabled. Vitals devices 130 may be any one of the devices described above, including scales to measure weight, glucose monitors to measure blood sugar levels, blood pressure measuring devices, pulse oximeters, or other monitoring and data producing devices. The measurements generated by these vital monitoring devices 130 are "scraped-off" to reduce the necessary data transfer volume, thus enabling them to be monitored by users of the system, including patients and physicians, patient care managers and other interested parties. The process of "scraping" involves eliminating ancillary data contained in a vitals device measurement data set not essential to the transfer of core data, such as contained in the layered packet transport protocol overhead. Gateways 110 are set up to form a mesh network in order to cover the entire facility housing the vitals devices 130. A particular gateway 110 determines which vitals devices it will monitor in view of which gateway receives the strongest signal from the particular vitals device 130. These measurements may be sent by the gateways 110 via transmission means 140 directly or over the Public Internet into Network Private Internet 150 for further processing, storage and dissemination. The gateways 110 that form a mesh network to cover the entire facility 105 may vary in their contained components as is necessary to most efficiently form a system that ties into transmission means 140. For example, selected gateways 110 may contain some or combinations of the radios and communication nodes used to transmit the data to Network Private Internet 150 as more fully described in the ensuing detailed description. The transmission means 140 may include transmissions via LoRaWAN referred to as "LoRa", radio networks 141, cellular radio networks 142, WiFi networks 143 and/or direct IP networks 144 that may include a cable modem or any components (not shown), such as an ethernet connection, enabling direct Internet Protocol (IP) transmissions. The transmission means 140 may in turn distribute the vitals measurements over the Internet for further distribution. One embodiment incorporates the ability to incorporate wearable devices, mobile phones, PDAs and/or other devices, which are generally designated as devices 135. In yet a further embodiment, devices 135 may be utilized to identify the particular user or patient utilizing a vitals devices 130. Prior to a gateway device connection being formed, devices broadcast amongst themselves identifying data in an attempt to solicit incoming connections. All gateways in proximity are able to receive these identification packets and correlate the ID's with known devices. The occurrences of the witness events can then be transmitted to a web service along with the associated received signal strength indicator of said packets. The service can use this information to coarsely constrain the relative location of identified devices at various moments in time. If a vitals measurement is then taken, the relative position of all devices in the environment can be further queried for that instant. This data may be useful to ascertain the identity of the person that is using the vitals measurement device, or more specifically, used to differentiate between a small number of people that may have used the measuring device, such as the residents of a home.

Network Private Internet 150 may be used to distribute vitals information to any number of users of the system, including to electronic health records (EHR) 160 that may in turn be transmitted or accessed by, for example, by authorized physicians 161 and/or authorized patients 162. The vitals information or data may be also be distributed directly via Network Private Internet 150 to, for example, third parties such as care management 180, patients 185, and/or personalized data services 190.

Network Private Internet 150 may also distribute such vitals information and/or data to secure data management services 170 that may be a part of Network Private Internet 150 and may be capable of secure long term storage for various purposes including archival, analytical and such purposes as more fully described in connection with, e.g., FIG. 4. Secure data management services 170 that may constitute what is referenced as the secure network back end, may preferably be located within Network Private Internet and/or the secure network back end.

Figure 7:
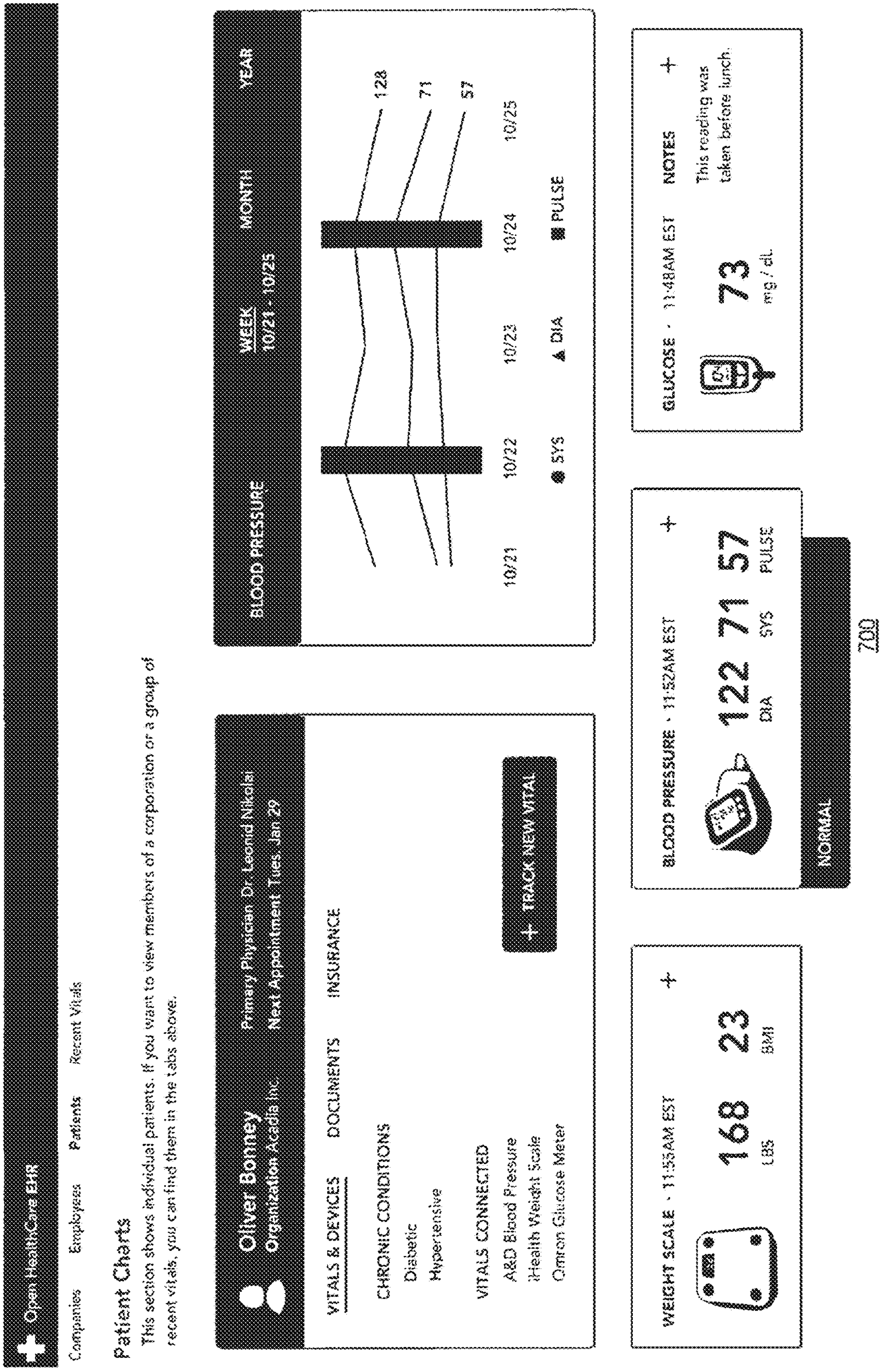
FIG. 7 illustrates a possible human interface enabled by an embodiment of the present disclosure.

Data may then be processed by the remote secure data management services 170 in such a way as to allow for direct insertion of certain patient information into an EHR 160. It may also be analyzed for anomalies or critical situations where manual intervention may be necessary to ensure integrity of such data and information. FIG. 7 illustrates a type of user interface that may be enabled by the present disclosure, with specific regard to displaying long term vitals measurement data and historical trends.

With reference to FIG. 1 and a more general wireless communication system 100, the gateway devices 110 may be installed into a mesh network in facility 105 as needed to ensure communication between the monitoring equipment such as vital devices 130 and at least one gateway device 110. The vital devices 130 are generally Bluetooth devices, more particularly BLE devices. Depending on the number and location of the vitals devices 130, gateway devices 110 can be installed and positioned in the user's facility 105 to maximize communication with vitals devices 130 to enable the secure communication of data and information to the gateway devices 110. The gateway devices 110 may be equipped with various radios and communication components necessary to ensure communication over every supported communication network described in FIG. 1.

Figure 2:
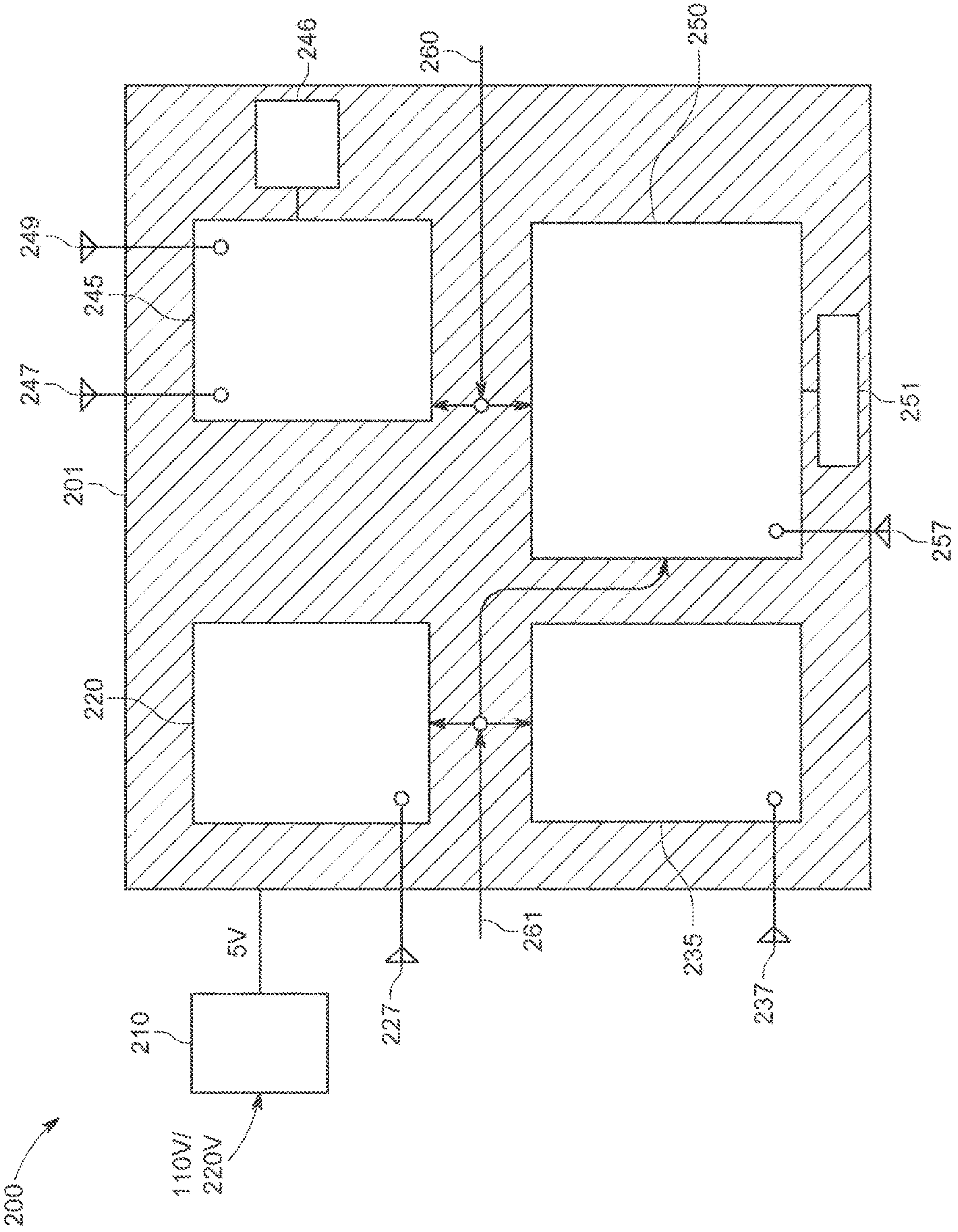
FIG. 2 illustrates the internal components of a device gateway according to a preferred embodiment of the present disclosure.

As seen in FIG. 2, a device gateway 110 may contain a BLE radio 220 including or coupled to a real-time-capable processor module; in a preferred embodiment radio 220 may be a Bluetooth radio controller. BLE radio 220 also may include a Bluetooth antenna 227, or a connection to a 2.4 Ghz antenna 227. Module 250 may be a single board computer that may contain integrated flash memory, dynamic random access memory (DRAM) and microprocessor (MPU). In a preferred embodiment, module 250 may be a more powerful single board computer and include a WiFi transceiver with a connection to a 2.4 Ghz antenna 257. Microcontroller 220 is responsible for maintaining the consistent over-the-air profile of the gateway device from the perspective of a smart home device 130. This is achieved by using low-level packet send/receive functions without making use of functions that may be capable of introducing random amounts of buffering and/or the reordering of packets. BLE module 220 also facilitates key exchanges between gateways 110 and vitals devices 130, establishing the mesh network of multiple gateways 110, scanning various vitals devices 130 to determine events such as new readings and/or measurements obtained from the vitals devices 130, enabling communication with vitals devices by supplying the correct and/or updated drivers for such devices 130, and creating secure connections to transfer such readings and measurements from devices 130 and the software running on Module 220. Module 220 can also communicate with devices that can function as a personal assistant hub including, but not limited to, devices that can run Google Home and Amazon Alexa; physical embodiments of device may be offered on Alexa, Google Home, Apple TV or third party system offering a wireless radio capability; these functions are more fully described hereinafter. All elements described in this paragraph are contained on circuit card assembly 201.

The gateway 110 may also contain a LoRa module 235 which may have a LoRa compatible transceiver and associated protocol stack running on either an included processing unit or another processor embedded into the gateway. LoRa module 235 may include a connection to a 915 MHz antenna 237. In a preferred embodiment, module 250 is programmed to control LoRa module 235 as well as to control any link between the BLE module 220 and the LoRa module 235.

The gateway 110 may contain a cellular radio 245 as well as a higher performance CPU in the form of a embedded computer 250 to manage this high bandwidth connection. This higher performance computer 250 is capable of running a standard operating system such as Linux, while simultaneously maintaining a secure channel to a remote server using a virtual private network (VPN) or other encrypted transport channel; remote updates to the software for all processors are possible over such a link. By a preferred embodiment utilizing a mini PCIE card 240 for the cellular radio 245, further in combination with computer 250, may allow for economies of scale to be achieved while providing a high performance computer 250 capable of being programmed as necessary to achieve various functionalities. In a preferred embodiment, a subscriber identity module (SIM) card 246, which is attached via a mini PCIE card 240, to enable authorized access to cellular networks. In a preferred embodiment a MicroSD 251 or Embedded MultiMediaCard (eMMC) 251 is attached to this higher performance computer 250 in order to provide bulk storage for software as well as long term logs of measurements taken and other logs useful for debugging.

A preferred embodiment for gateway 110 includes a BLE radio 220, a LoRa radio 235, a cellular radio incorporated into PCIE card 245 that further includes both primary antenna 247 and a diversity antenna 249, and a computer module 250. The foregoing components are connected via a serial connection 261, and Universal Serial Bus (USB) 260 and may be powered by a power supply unit (PSU) 210, which may be plugged into a 110V/220V wall outlet and constructed to convert alternating current to direct current that supplies 5 volts of power to gateway unit 110 and its components. Gateway 110 may solely utilize the BLE radio 220 or combinations of the above identified components and radios. Gateway 110 must provide at least one link between bluetooth and connection methods 140. Since nearby Gateways 110 may provide such a connection, a given gateway may need only contain BLE module 220, omitting LoRa Radio 235, MPU module 250 and cellular module 245, so long as it is known that at least one gateway within the mesh can provide a service 140. Relatedly, an installed Gateway 110 meant to provide a service 140, may need only contain BLE module 220 along with LoRa module 235, if LoRa is the chosen transport. MPU module 250 can be included to give WiFi support, along with a cellular module 245 for cellular access.

Figure 3:
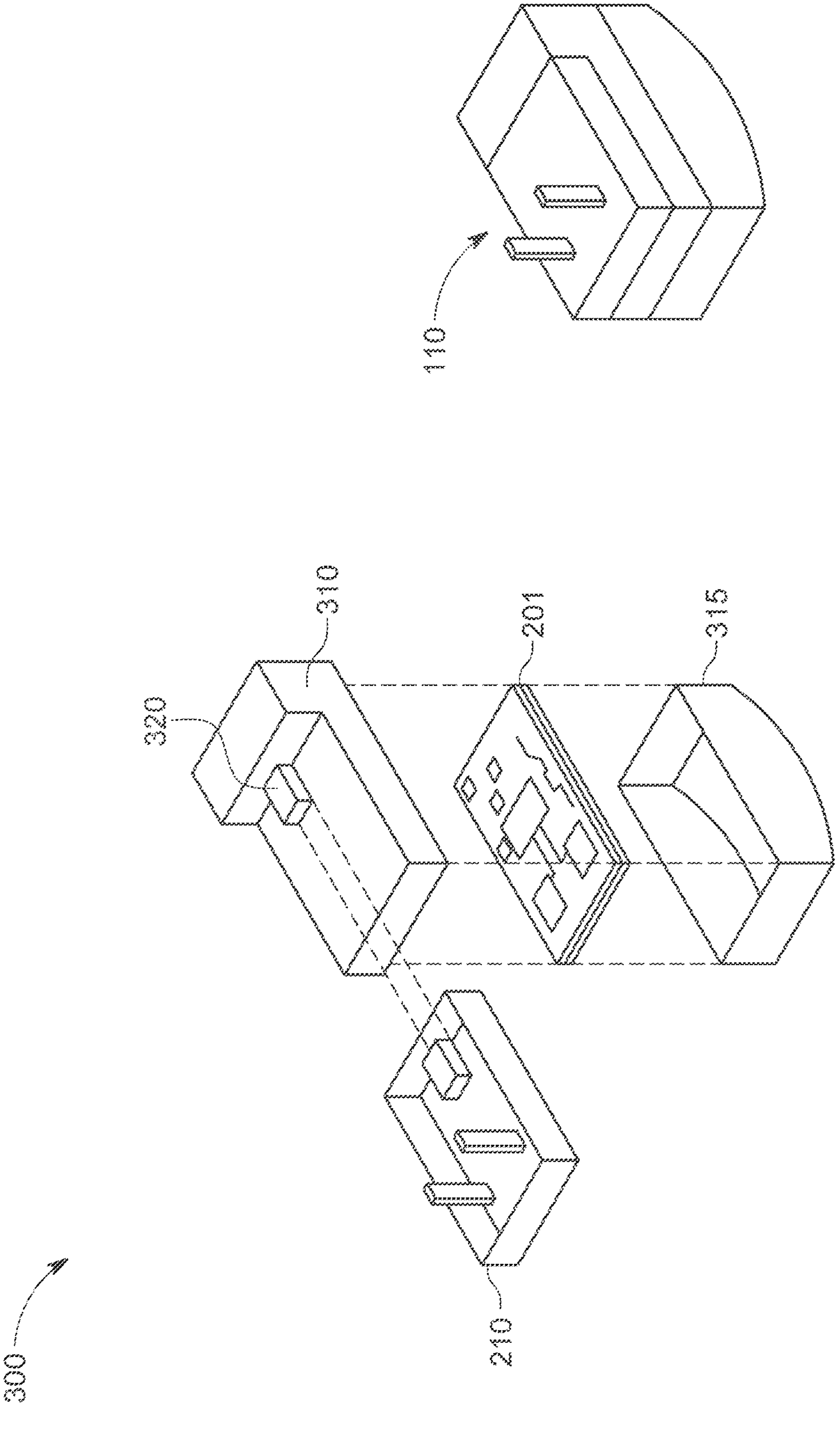
FIG. 3 illustrates a perspective view of a wireless gateway device according to an embodiment of the present disclosure.

With reference to FIG. 3, an embodiment is shown regarding the structure of gateway 110, showing that PSU 210 slidably and removably engages into slot connectors to make electrical contact with gateway connector contacts, preferably using a standard USB connector 320 permanently affixed to mating assembly 310. This design enables the replacement of PSU 210 should it fail or should different requirements be demanded by the components and/or radios of gateway 110. PSU 210 may be purchased or designed to be in accordance with various electrical and safety codes as well as serve as a power limiting device to ensure the safety of other components within gateway 110. Housing 315 is used to enclose the sensitive electronics from the environment.

Figure 4:
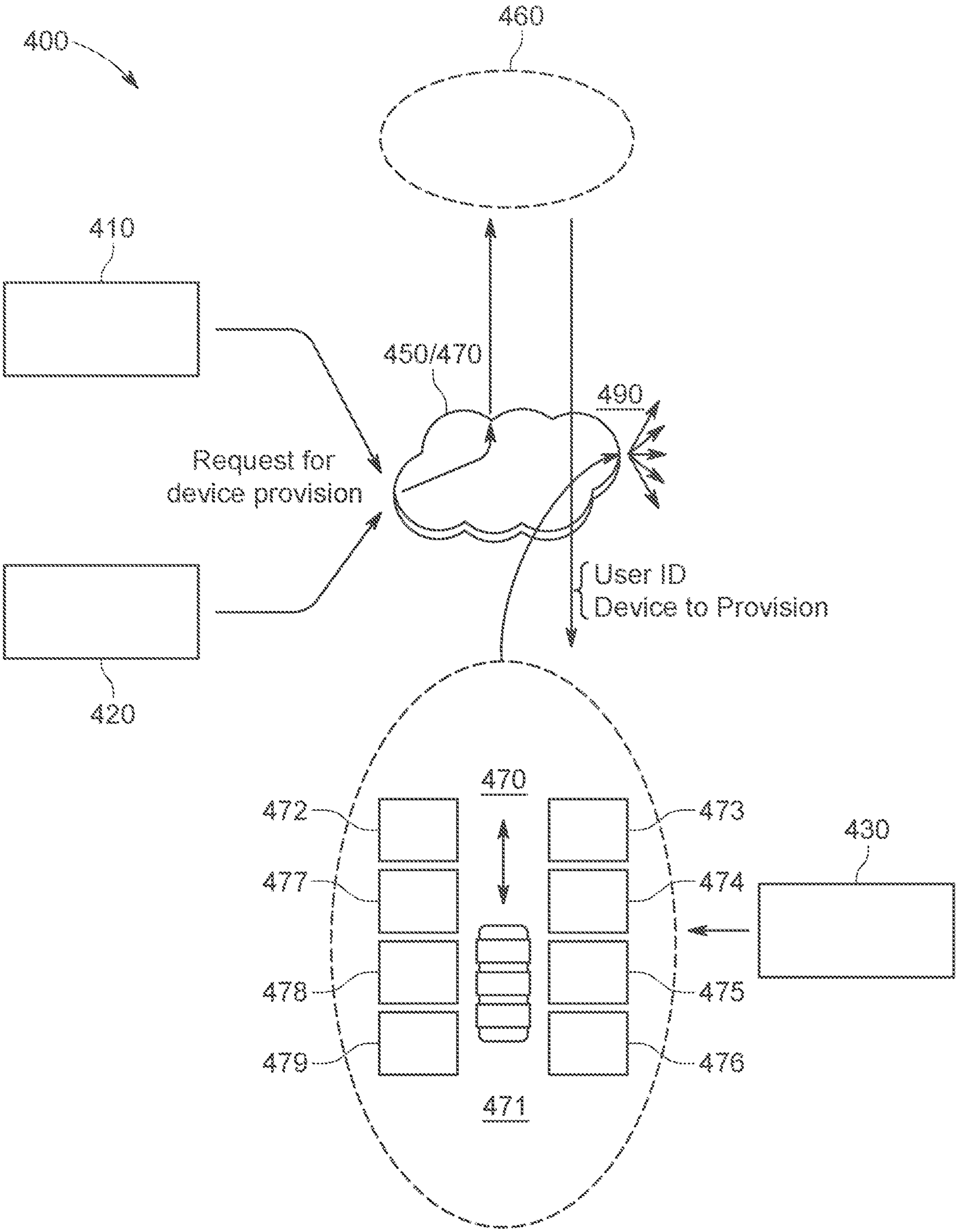
FIG. 4 is a block diagram illustrating the flows of data during management operations according to an embodiment of the present disclosure.

With reference to FIG. 4, either a user 410 or their health care provider 420 may elect to provision a new vitals device 130 through gateway 110. During this process, a request to provision the device is made via inputting information including, for example, the User ID and the identification of the vitals device in encrypted form over secure back end 450 in communication with secure management services ("MS") 470. MS 470 may preferably be a part of the secure back end 450 and access information from various platform services, through, for example, database server 471 ("Webserver/API) that ensures what information can be read, written or modified depending on user permissions. The services may further include, for example, trusted vault 472, data storage management 473, data analysis server 474, mapping Hubs (Patients) 475, Webserver Authentication 476, Secure Gateway (for Hubs) 477, Secure Gateway (for internal personnel) 478 and Hub network management (updates, status) 479. As shown in FIG. 4, secure communication may include encrypted and secure communication of the private network internet 450 and network back end 470 with cloud service 430. The database services in back end 470 may be updated from time to time and, for example, when a new device is provisioned, Hub network management 479 attempts to transfer the software, new data and/or updates to the relevant gateways on a best efforts basis, via links 490 to gateways 110—these encrypted provisioning packets contain the driver code and may contain device keys, if relevant, to "scrape" the configured target vitals device for storage and use by network 100; device keys may be transferred from trusted vault 472 when needed. These requests can be initiated by any software or website 460 with sufficient privileges to make the request. Website 460 may be the front end that monitors the vitals or enables initiating provisioning for a new vitals device as is more fully described herein and shown in FIG. 7. Alternatively, external interfaces 410 and 420 may with the appropriate authorization and security clearances access network back end 470 through webserver/API 471 which in turn communicate with data storage 473, mapping Hup 475 through secure gateway 477 back to gateways 110. Authentication may be a password/user or access token provided by the network or may be multi factor authentication (e.g., phone plus password/username) that are served via webserver 476. Authorized users may also use Website 460 to access EHR 160. The database (DB) 471 may contain the MAC addresses for the vitals devices 130 and gateways 110, relevant links and code to extract vitals data. DB 471 may also contain a unique encrypted patient ID accessed through back end server. Internal network personnel may access back end network 470 directly through secure gateway 478, where the vitals devices 130 and gateways 110 are housed together with owners of these devices and case managers for these devices.] DB 471 may additionally contain physician or other interested user information and link this information to the users of the vitals devices via interaction of servers for mapping hubs 475, data storage 473 and data analysis 474.

Once the provisioning request is extended, an attempt is made to locate the corresponding gateways in proximity to the specific user, then the provision is stored in the hub network management database 479. Upon location of corresponding gateways 110, MS 470 forwards the requisite information to the correct gateway via links 490 via secure gateway 477.

The real-time processor associated with the BLE module 220 is responsible for executing smart device specific drivers during every connection. These drivers may be distributed in a binary device-agnostic form and in a preferred embodiment, a reformatted variant of the WebAssembly binary format. These drivers are relatively small and can be transferred even over low-bandwidth links such as LoRa. Multiple drivers can be simultaneously loaded on the real-time processor 220 of gateway 110 in unique combinations specific to the gateway 110, in particular by making use of knowledge of which devices 130, 135 are expected to be in range.

Figure 5:
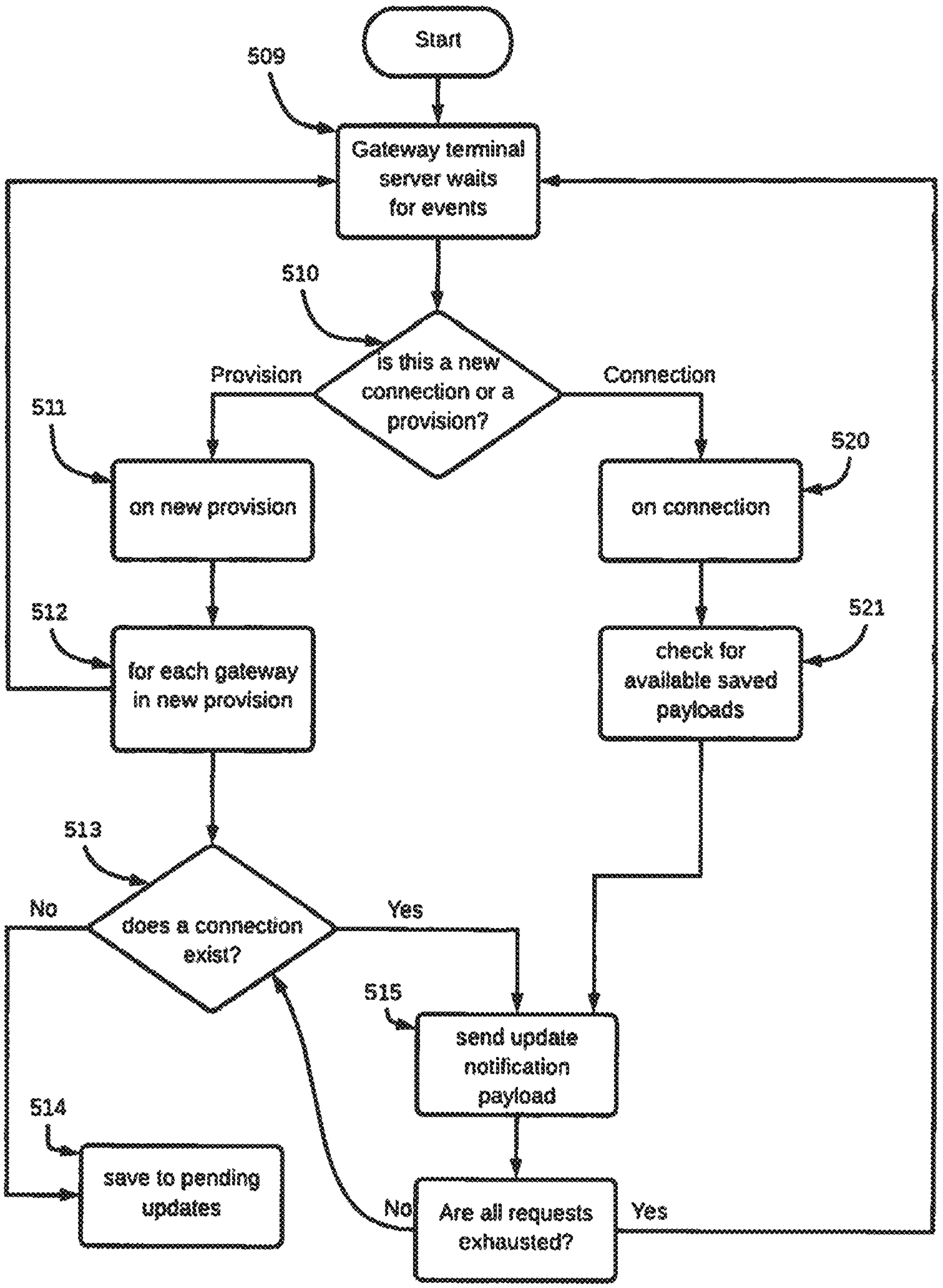
FIG. 5 is a block diagram illustrating the event listening state machine according to an embodiment of the present disclosure.

FIG. 5 illustrates the steps used in the gateway's connection and provisioning process. Element 509 shows the first step wherein the gateway terminal server waits for events. When an event is detected element 510 determines if the recognized event corresponds to a provisioning request or to a connection request. Element 511 determines if the event is associated with a new provisioning request passing this information to element 512 which determines for how many gateways a provisioning requests is required; for each gateway in a new provisioning request the flow returns back to element 509 where the previously described flow continues until all provisioning requests first detected are exhausted. Once element 513 is completed, it will determine if a connection already exists, if not, then element 514 saves the provisioning request(s) to a queue of pending updates; if determined that an positive affirmation response such as a "yes", is expected, then element 515 sends an update notification payload to the requesting gateway and then returns to element 513 until all request are exhausted after which the procedure returns to element 509 to await receipt of new events. In the case that element 510 had determined that a connection request was detected element 520 will confirm that the connection request is valid and element 521 will check for pending payload packets to be sent by invoking element 515 until the entire series of requests are transmitted to the requesting gateway. Upon completion the process returns to element 509 to await new provisioning and connection requests.

Figure 6:
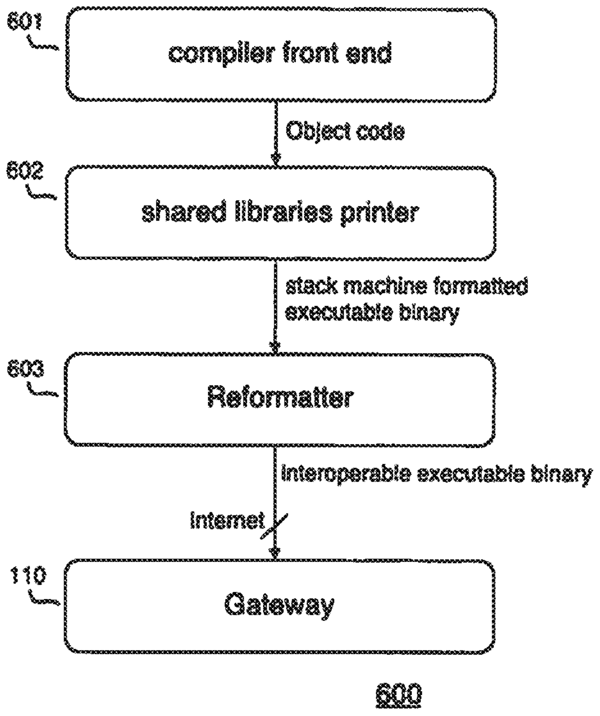
FIG. 6 is a block diagram illustrating the process of converting commonly well-understood human readable code to a machine executable code in accordance with a proscribed embodiment of the present disclosure.

FIG. 6 illustrates how the software that executes on the gateway 110 is first reformatted by a series of pre and post processors. The source code is first run through a compiler 601 to output a readily understood object format. The object code is then processed by a shared libraries printer 602 that optimizes the object code for execution on a stack-oriented virtual machine (VM) architecture. In order to reduce the bandwidth required for transport over certain networks, the reformatter 603 optimizes the executable image into a more, size and load time, efficient format; this format is interoperable among the supported devices.

Multiple services require access to very private information that should at all time be secure, this includes for instance PPI (Protected personal information such as SSN, name, biometric records) or PHI (Personal Health Information, covered by HIPAA) or Consumer Financial Information. This access is often needed to be able to identify a consumer, or patient or because the mentioned services need to display information related to these persons. Usually this implies that these services need to get certified and have policies justifying that they took enough precaution to avoid being breached and leak these very secure information. Although as time shows most of these systems are more and more subject to attacks regularly because of the value of the information they hold. The exposure is getting bigger as more services are getting more interconnected and therefor spreading the secret. The certification and audits do not insure security and cannot monitor everything. And even companies following the guidelines for protecting this data can be breached.

The three methods afforded in the implementation for the security of secure BLE devices are: authentication, confidentiality and authorization. Many BLE slave devices may refuse to transmit vitals data if the link encryption protocol is not enabled. Additionally, most devices require some sort of mechanical user input, such as pushing a specific button in order to enable encryption with a new peer. With reference to FIG. 4, an embodiment allows short term keys that may be generated during the initial bonding process of gateways 110 with devices 130 to be converted into long term keys that may be sent to management services ("MS") 470 via secure gateway 477 and a long term key may be stored in trusted Bluetooth device key vault 472 in encrypted form. If, at a later time, a different gateway 110 in environment 105 makes a connection to vitals device 130 then the exchange of information for short term key (and/or numeric comparison) pairing may be avoided and gateway 110 may then request a copy of the long term key from MS 470, by using this shared secret key known only to the particular instance of gateway 110 and retrieving it for pairing purposes from trusted vault 472. This embodiment avoids the need for vitals device 130 from having to re-pair itself with gateway 110 using short term keys and/or numeric comparison techniques.

In an embodiment of the present disclosure the solution to avoid access to private information is to avoid at any time for the platform 100 of the present disclosure to come into contact with or have access to the protected information. Accordingly, even if the platform 100 is breached there would be no leak of private information. However, there is still a need to provide access to readable information that includes the protected information. Thus, when working with a system (such as for instance an electronic health record) there is a need to provide to individuals who already have access to the third-party system itself a way to see and use protected information data on the present platform without at any point having the platform's servers transmitting this protected information.

When an existing record of a patient/consumer needs to be connected to the system's platform 100, the client side on Website 460 of this platform checks if the system has an "Identifier" for this record, if not, the platform's backend 470 creates a new identifier (random) and the client side of the platform (not the platform backend) injects it in the system. From there the table to match this ID to a given record only exists within a third-party system. So only a breach of the server that already holds the protected information itself could map protected information to the secure platform data. When data is transmitted from a secure device of the present disclosure to the third-party system holding protected information, the data is transmitted without any protected data and is saved on the secure server 470 in data storage 473 after matching the secure device identifier to the platform ID. So even at this point the data does not contain any protected information and the only way to find out what protected information is related to the platform ID or the device is only in the secure third-party system.

Upon request by the third party system, the data can be injected from the platform system 470 into the third party system by using the platform's ID; at this point the backend platform 470 only knows the platform ID to ask this request and is unable to map them to any kind of protected information. Upon request of access, if the user has access to the third-party system (because he is a doctor of the hospital authorized on the EHR on an operator that has been authorized by this third-party system) then user will be able to map platform's data to actual records. Any user that would be authorized on platform systems 100, but does not have an individual authorization to access the third-party system would not be able to access any of this information. The client side in Website 460 of the platform 100, which is running on the user's computer will retrieve information from both platform 100's backend 470 and the third-party secure system to merge the protected information and the platform data dynamically upon display without storing anything. At no point is the protected information transiting, or saved on any platform 100, including but not limited to gateway 110, device 130, backend 470 or Website 460. Only a user with an authorization to access the third-party system could then make a copy of the protected information. But this permission was already existing and given by the third party.

One embodiment pairs devices such as vitals devices 130 with gateways 110 to be used in the platform 100 in a controlled environment. In this environment network back end 470 may be a secure facility where no attacker can be physically present, and have radio signal propagation protection; this network back end 470 would be safe from Man in the middle attack using a secure set up that would put the Bluetooth vitals device 130 out of radio access of any potential attacker. Vitals device 130 would then be paired to gateway device 110 and the bonding information (which includes a long-term key) is stored by the platform trusted vault 472 and can be used for future pairing of the same vitals device 130 and gateway 110 in the platform's network. This methodology limits future pairing weaknesses, e.g., of vitals devices 130 using old standards or non-secure methods, reliance upon the user to manually check the numeric comparison (human error), and simplification of the overall process for a user, as the vitals device 130 once paired, won't require any new pairing by the user. As part of the present platform system 100, only secure communication devices registered into the platform 100's Virtual private network 470 may get access to the known platform secure device Bluetooth ID and long-term keys from other devices of the network and "impersonate" these pre-paired devices to let the Bluetooth device accept the link without going through pairing and authentication again. The present methodology may also remotely revoke any access to a given device of the network 100 by revoking its keys from the platform 100's key storage vault 472.

Figure 8:
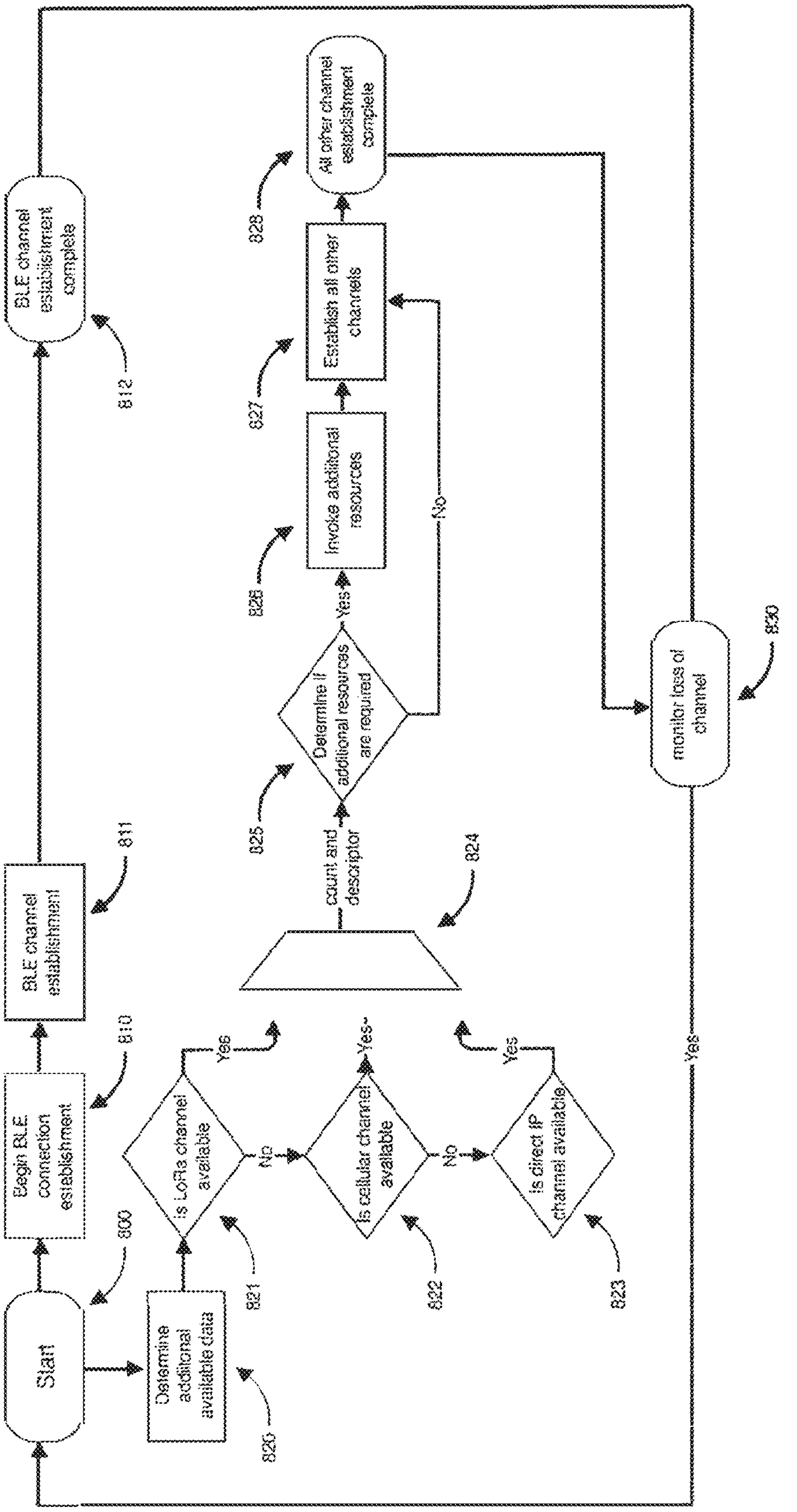
FIG. 8 illustrates the initialization process flow at start-up.

FIG. 8 illustrates the initialization process that occurs within a gateway 110 when a gateway is first powered-on. The process begins with the introduction of power as shown in FIG. 8 as the initialization element labeled "Start" 800. Once all the power-on ramps-up and the down-converting power sequencing has been completed the gateway proceeds to identify and establish all available communication channels. The gateway's processor first establishes a communication path using the Bluetooth channel per 810 and 811 resulting in 812. The gateway systematically queries all other available communication pathways by checking for the availability of a LoRa, a WiFi, a cellular, and a direct channel using direct IP connectivity. The gateway determines the availability of all potentially available pathways 820 using the logical inferences contained in 821, 822, 823 and 824. Based on this query stage, 824 may invoke additional computational resources as determined by 825 by invoking 826 as needed. Once all the additional channels are established using 827, the gateway enters a quiescent mode following 828 wherein the gateway 110 monitors all identified channels for maintaining connectivity on every possible communication path using 830. In the event that a channel has been detected as not available to the system monitoring subsystem 830 begins the process of re-identifying and re-establishing available paths by reverting to stage 800. The gateway hardware is typically pre-built to contain sufficient resources to contain the processing power necessary to maintain a maximal multi-protocol communication system.

At system initialization time, the gateway 110 performs a process of identifying all possible available communication channels; this flow is illustrated in FIG. 8. This process entails establishing a BLE channel first, and from there seeking any and all possible additional offered communication channels, be they offered via LoRa, WiFi, cellular, or Ethernet or other protocols allowing connectivity such as direct IP connectivity. In the event that multiple channels are available the gateway will make a determination if more computational devices are required to best match with the requisite requirements. Resources may be predetermined at build time to minimize customer concerns.

Below is the description of the events that occur in a typical Bluetooth Low-Energy connection flow. Further details can be found in the Bluetooth Core Specification version 4.0 and later, which are incorporated herein by this reference. Specific details of the physical layer such as modulation, whitening and the various polynomials used and referenced in the referenced Bluetooth Core Specification are omitted for brevity. The specific meaning of bits, the frequencies used and the timing of the events in the channel are implemented in a manner as is known in the art. Special attention must be paid to the padding of fields during concatenation of the cryptographic primitives. All messages can lead to a variety of error notifications and subsequent handling conditions, all of which are understood by one of ordinary skill in the art.

Figure 9:
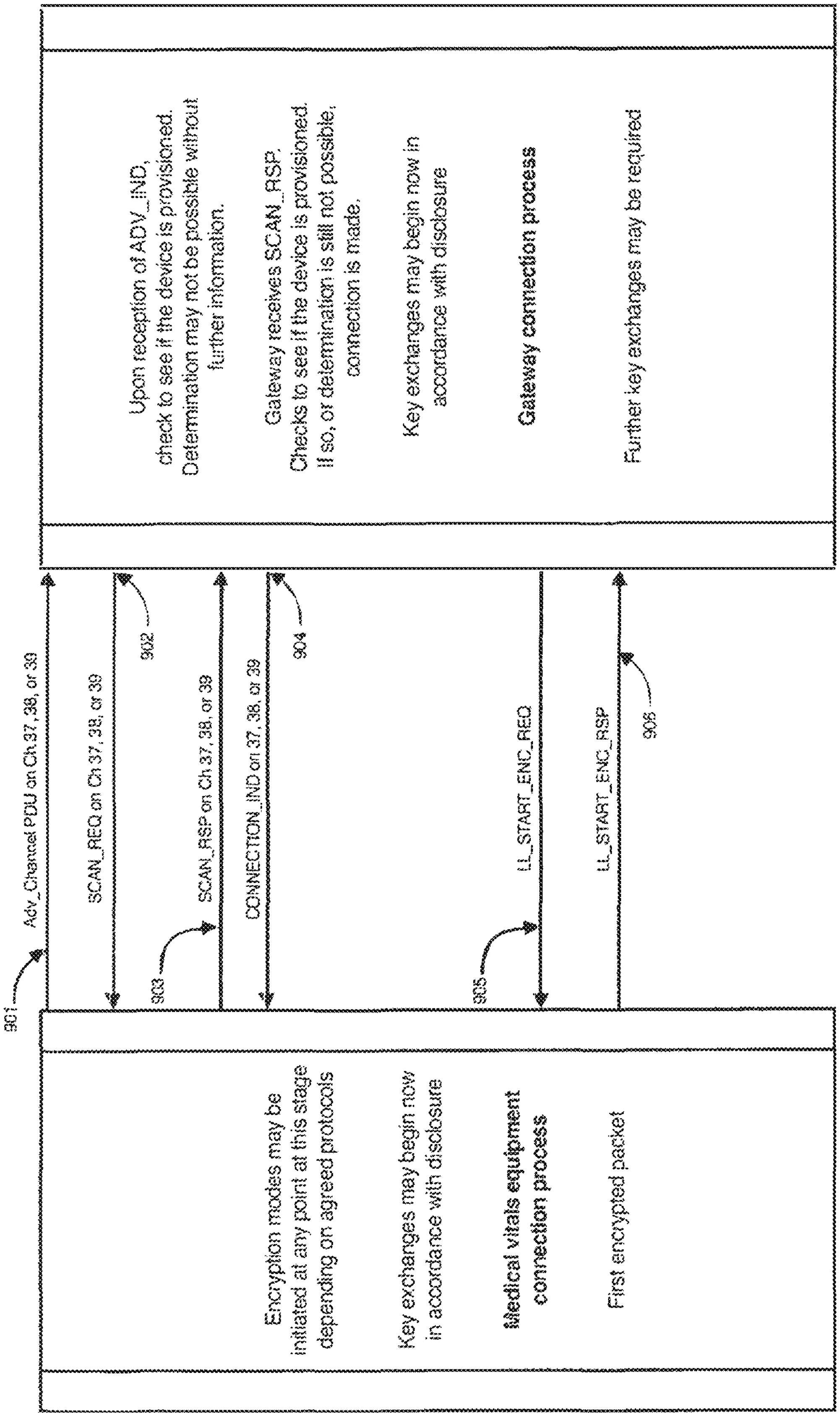
FIG. 9 illustrates the salient highlights of the protocol exchange that takes place in establishing a connection with a newly discovered BLE device being introduced and incorporated into a secure connection BLE environment.

FIG. 9 showcases the events comprising the typical connection between a bluetooth low-energy vitals device 910 and a master device such as a gateway 920. The vitals device initially advertises by sending a Adv Channel PDU message 901 on logical channel 37, 38 or 39. Once the gateway receives an ADV_IND message, it checks to see if the vitals device is provisioned. If additional information is needed to determine provisioning, the gateway 920 sends a SCAN- _REQ message 902 to which the vitals device 910 responds by sending SCAN_RSP message 903. If the gateway 920 acknowledges this as a valid request, it will respond with a CONNECTION_IND response message. At this point, a new Access Address is randomly generated by the gateway 920. Access Address is a connection unique identifier generated according to specified rules.

The media access control (MAC) address is critical to the identification of peers while establishing and securing the link. A mapping between device MAC address and a randomly generated Access Address is created when a connection is initiated. Bluetooth low energy has a feature that reduces the ability of an attacker to track a device over a long period by frequently and randomly changing an advertising device's address. This is the privacy feature. This feature is not used in the discovery mode and procedures but is used in the connection mode and procedures. If the advertising device was previously discovered and has returned to an advertising state, the device must be identifiable by trusted devices in future connections without going through discovery procedure again. The IRK stored in the trusted device will overcome the problem of maintaining privacy while saving discovery computational load and connection time. The advertising devices IRK was passed to the master device during initial bonding. Thus a master device will use the IRK to identify the advertiser as a trusted device. These features of the security extensions offered in the claimed invention improve limitations contained in the standard BLE security protocol. Since the BLE protocol exposes the MAC addresses of both the master and slave during a connection process, provisions to the protocol were made in which devices could remain anonymous. This is implemented by creating MAC addresses, which are periodically updated.

The device gateway 110 makes use of an address in the random private resolvable space in the BLE specification. This is used in bonded devices and requires the Identity Resolving Key (IRK) to be shared during Phase Three of the pairing procedure as defined in the Bluetooth Core Specification version 4.1. In usual practice, such addresses are made to change periodically based on a timer or other method whereas, in the present disclosure, such addresses may remain static. Each gateway 110 in environment 105, uses a different such address, all generated from this same IRK, where IRK is any suitable 128-bit key material. This allows the bonding keys to be transparently copied between trusted device gateways 110 in a manner that is more fully described herein. This implies that exists a multitude of MAC addresses that a peer will associate with correct link keys. The resulting scheme easily allows inter-gateway connections to be created for the purpose of meshing. In an embodiment gateway 110 may be the master, and vitals devices 130 may be the slaves. The IRK may be saved in the trusted vault 472. Each gateway 110 may have a unique MAC address from a subset of the Address of the BLE Specification which allows network devices to use the IRK for identification without going through the discovery mode again and disclosing its MAC address during pairing. Network devices can use the existing IRK from the trusted vault 472 to connect without advertising its MAC. And all hubs connected to the trusted vault 472 may share the existing bond to the slave device once created. This improves the security of the protocol and lets the network devices keep fixed MAC addresses private (instead of changing the keys regularly). Keeping the MAC fixed enables network devices to use meshing to connect different gateways 110 in a network over bluetooth and share the possibility to connect to a slave device 130 using the IRK on all units of the meshing network (even if some do not connect directly to the trusted vault 472).

What is claimed is:

1. A network node adapted to communicate with devices that are remote from the network node including receiving content data from the remote devices, the network node defining a first node and comprising a transceiver for communicating with the remote devices, and a processor and associated program instructions that cause the first node to:

(i) receive and store connection data that facilitates connection of the remote devices to the first node, wherein the presence of connection data corresponding to a particular remote device in the first node is required for the particular remote device to communicate content data to the first node;

(ii) maintain a consistent over-the-air profile during communications between the first node and connected remote devices from the perspective of the remote devices;

(iii) securely communicate with another node, defining a second node, and with a remote trusted server via a private network;

(iv) store the connection data in a remote trusted vault associated with the remote server;

(v) retrieve connection data for unconnected remote devices from either the first node, the second node or the trusted vault;

(vi) correlate an ID of the first node to the content data, defining entity data, indicative of an entity associated with the content data, and use the correlation for storage of data indicative of the content data on the first node and/or trusted vault without storing any of the actual content data therein; and, (vii) transmit the connection data and entity data to the remote server via the private network;

the transceiver comprising one or more of a LoRa radio, a cellular radio, a WiFi radio, an Ethernet connection, or a direct IP connection (each a "communication channel") for communicating with the remote server and the second node, and wherein the program instructions further cause the first node to determine which of the communication channels is present in the first node and to determine which one or more of the communication channels to employ in communications with the remote server, the first node, and the second node.

2. The network node according to claim 1 wherein the program instructions cause the first node to retrieve connection data for an unconnected remote device from either a library in the first node or the second node or from the trusted vault and connect the unconnected remote device to the first node without employing a manual connection technique.

3. The network node according to claim 1 wherein the program instructions cause the first node, upon detecting the presence of an unconnected remote device, to communicate with the second node to attempt to obtain the connection data for the unconnected remote device or to communicate with the remote server to obtain the connection data for the unconnected remote device from the trusted vault.

4. The network node according to claim 1 wherein the connection data stored in the trusted vault define long term pairing keys.

5. The network nide according to claim 1 wherein, with respect to content data received by the first node gateway from the remote devices, the program instructions cause non-essential data to be removed such that only essential content data is transmitted to the remote server.

6. The network node according to claim 1 wherein the program instructions cause the first node to form a mesh network with the second node.

7. A network node adapted to communicate with devices that are remote from the network node, including receiving content data from the remote devices, the network node defining a first node and comprising a transceiver for communicating with the remote devices and a processor and associated program instructions, the transceiver comprising one or more of a LoRa radio, a cellular radio, a WiFi radio, an Ethernet connection, or a direct IP connection (each a "communication channel") for communicating with a remote trusted server via a private network and another network node, the program instructions causing the first node to:

(i) receive and store connection data that facilitates connection of the remote devices to the first node, the presence of connection data corresponding to a particular remote device in the first node being required for the particular remote device to communicate content date to the first node;

(ii) maintain a consistent over-the-air profile during communications between the first node and connected remote devices from the perspective of the connected remote devices;

(iii) receive content data from the connected remote devices;

(iv) cause the first node to determine which of the communication channels is present in the first node and to determine which one or more of the communication channels to employ in communications with the remote server and the other network node;

(v) securely communicate with the other network node or the remote server;

(vi) store the connection data in a trusted vault associated with the remote server;

(vii) retrieve connection data for unconnected remote devices from either a library in the first node, a library in the other network node, or the trusted vault;

(viii) pair the unconnected remote devices to the first node without manual interaction;

(ix) correlate an ID of the first node to the content data, defining entity data, indicative of an entity associated with the content data, and use the entity data for storage of data indicative of the content data on the first node, the remote server and/or the trusted vault without storing any actual content data on either the first node, the remote server or the trusted vault; and, (x) transmit the connection data and the entity to the remote server via the private network.

8. The network node according to claim 7 wherein the remote devices and the first node are compliant with a standard that automatically pairs the remote devices to the first node.

9. The network node according to claim 7 wherein the program instructions cause the first node to retrieve connection data for an unconnected remote device from either a library in the first node or from a library in the trusted vault and employ the connection data to connect the unconnected remote device to the first node without employing a manual connection technique.

10. The network node according to claim 7 wherein the program instructions cause the first node, upon detecting the presence of an unconnected remote device, to communicate with the other network node to attempt to obtain the communicate data for the unconnected remote devices and if the other network node does not have the connection data for the unconnected device stored therein, to communicate with the remote server to obtain the connection data for the unconnected device.

11. The network node according to claim 7 wherein, with respect to content data received by the first node from the remote devices, the program instructions cause non-essential content data to be removed such that only essential content is transmitted to the remote server.

12. The network node according to claim 7 wherein the program instructions cause the network node to form a mesh network with the other network node.

* * * * *